United States Patent
Yeh et al.

(10) Patent No.: US 8,355,087 B2
(45) Date of Patent: Jan. 15, 2013

(54) PIXEL ARRAY SUBSTRATE, CONDUCTIVE STRUCTURE AND DISPLAY PANEL

(75) Inventors: Tsai-Chi Yeh, Yunlin County (TW); Chih-Chun Chen, Hsinchu County (TW); Wen-Hui Peng, Hsinchu County (TW); Ting-Shiun Huang, Kaohsiung (TW); Sheng-Yun Hsu, Yunlin County (TW)

(73) Assignee: Au Optronics Corporation, Hsinchu (TW)

( * ) Notice: Subject to any disclaimer, the term of this patent is extended or adjusted under 35 U.S.C. 154(b) by 251 days.

(21) Appl. No.: 12/957,410

(22) Filed: Dec. 1, 2010

(65) Prior Publication Data
US 2012/0044432 A1 Feb. 23, 2012

(30) Foreign Application Priority Data
Aug. 19, 2010 (TW) .............................. 99127782 A

(51) Int. Cl.
*G02F 1/136* (2006.01)
*G02F 1/1343* (2006.01)
(52) U.S. Cl. ........................... 349/42; 349/138; 349/143
(58) Field of Classification Search .................... 349/42, 349/43, 138, 139, 142, 143
See application file for complete search history.

(56) References Cited

U.S. PATENT DOCUMENTS

| | | | |
|---|---|---|---|
| 2004/0183988 A1* | 9/2004 | Austin et al. | 349/155 |
| 2008/0143944 A1* | 6/2008 | Chang et al. | 349/139 |
| 2008/0266508 A1* | 10/2008 | Kim | 349/152 |

FOREIGN PATENT DOCUMENTS
TW 200919009 5/2009

* cited by examiner

*Primary Examiner* — Brian Healy
*Assistant Examiner* — Mary El Shammaa
(74) *Attorney, Agent, or Firm* — Jianq Chyun IP Office

(57) ABSTRACT

A pixel array substrate includes a substrate having a display region and a non-display region, a pixel array in the display region, first and second lead lines, first pads in the non-display region, second pads in the non-display region and on a first insulating layer, and the first insulating layer. The first lead lines electrically connect the pixel array and extend from the display region to the non-display region. Each first pad electrically connects one corresponding first lead line. The first insulating layer covers the first lead lines and exposes the first pads. The second lead lines on the first insulating layer electrically connect the pixel array and extend from the display region to the non-display region. Each second pad electrically connects one corresponding second lead line. A distance between each first pad and the adjacent second pad along a horizontal direction is 10 um~20 um.

19 Claims, 10 Drawing Sheets

PIXEL ARRAY SUBSTRATE, CONDUCTIVE STRUCTURE AND DISPLAY PANEL

CROSS-REFERENCE TO RELATED APPLICATION

This application claims the priority benefit of Taiwan application serial no. 99127782, filed on Aug. 19, 2010. The entirety of the above-mentioned patent application is hereby incorporated by reference herein and made a part of this specification.

BACKGROUND OF THE INVENTION

1. Field of the Invention

The invention relates to a pixel array substrate, a conductive structure, and a display panel.

2. Description of Related Art

In general, a liquid crystal display (LCD) panel of an LCD includes a pixel array substrate, a color filter array substrate, and a liquid crystal layer sandwiched by the two substrates. In the pixel array substrate, pads and lead lines are disposed in a non-display region, such that the pixel array and the driving chip are electrically connected to each other.

With development of the displays, the multimedia display function and high resolution are basic requirements for small-size display panels. In order to comply with said requirements, a driving chip with more channel has been developed, while the dimension of the driving chip remains unchanged. On the premises that the small-size display is characterized by the multimedia display function and high resolution, and that the number of the driving chips remains unchanged in consideration of costs, how to shorten the distance between pads in the non-display region of the display and together employ the driving chip having multiple channels have become one of the focuses in development of displays.

SUMMARY OF THE INVENTION

The invention is directed to a pixel array substrate, a conductive structure, and a display panel, which can effectively reduce the pitch between pads.

The invention provides a pixel array substrate that includes a substrate, a pixel array, first lead lines, first pads, a first insulating layer, second lead lines, and second pads. The substrate has a display region and a non-display region. The pixel array is located in the display region. The first lead lines are electrically connected to the pixel array and extend from the display region to the non-display region. The first pads are located in the non-display region. Each of the first pads is electrically connected to a corresponding one of the first lead lines. The first insulating layer covers the first lead lines and exposes the first pads. The second lead lines are located on the first insulating layer and electrically connected to the pixel array. Besides, the second lead lines extend from the display region to the non-display region. The second pads are located in the non-display region and disposed on the first insulating layer. Each of the second pads is electrically connected to a corresponding one of the second lead lines. Particularly, a distance between each of the first pads and the adjacent second pad along a horizontal direction is about 10 um~about 20 um.

The invention further provides a display panel that includes the aforesaid pixel array substrate, an opposite substrate located opposite to the pixel array substrate, and a display medium located between the pixel array substrate and the opposite substrate.

The invention further provides a conductive structure that includes a first pad, a first lead line, a first insulating layer, a second pad, and a second lead line. The first lead line is electrically connected to the first pad. The first insulating layer covers the first lead line and exposes the first pad. The second pad is located on the first insulating layer. The second lead line is located on the first insulating layer and electrically connected to the second pad. Here, the first lead line and the second lead line are located between the first pad and the second pad, and a distance between the first pad and the second pad is about 10 um~about 20 um.

Based on the above, the distance between each of the first pads and the adjacent second pad along the horizontal direction is about 10 um~about 20 um, and the first pads are separated from the second pads by the first insulating layer. Therefore, the pitch between the first and the second pads can be effectively reduced, and no short circuit occurs between the first and the second pads.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
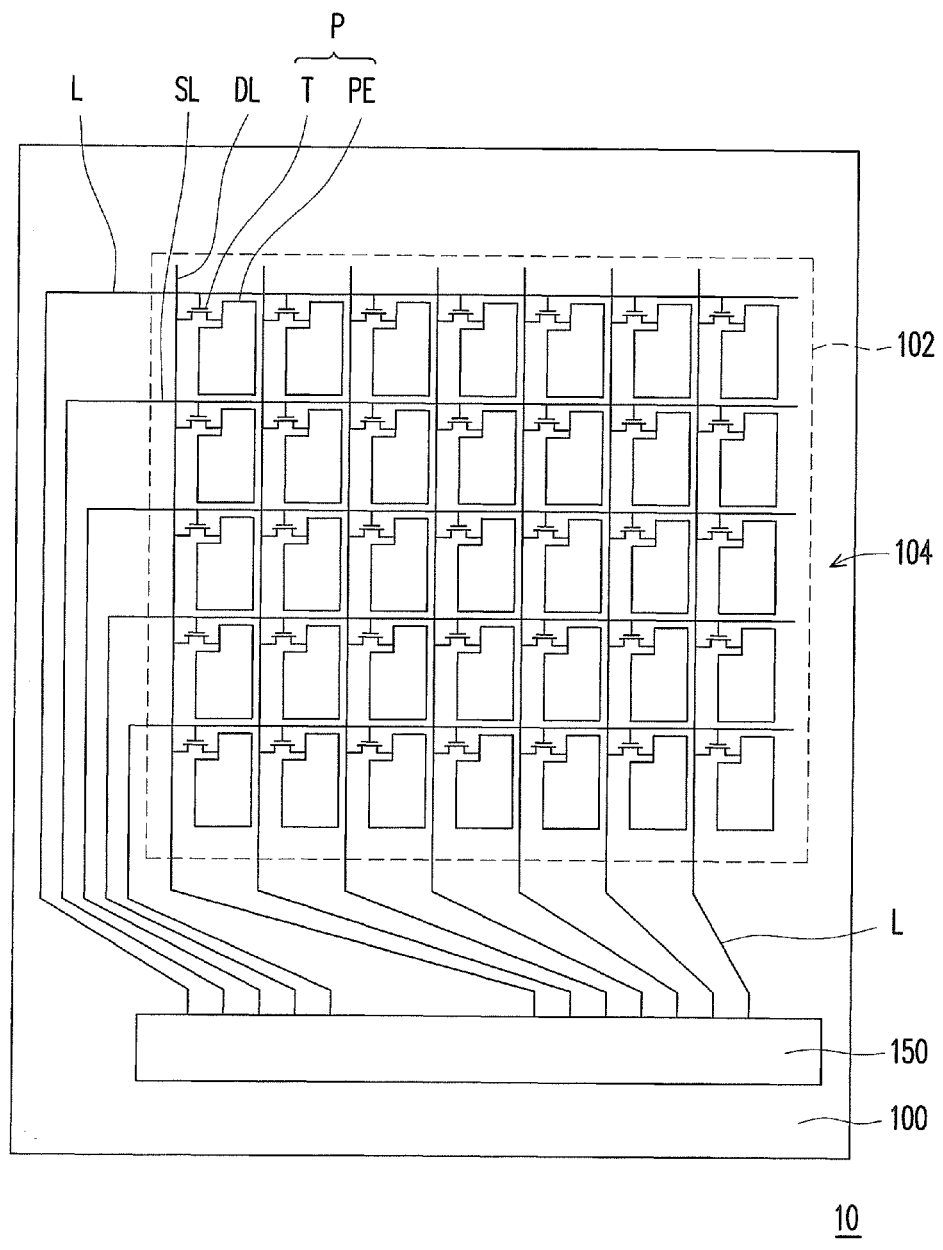
FIG. 1 is a schematic top view illustrating a pixel array substrate according to an embodiment of the invention.
Figure 2A:
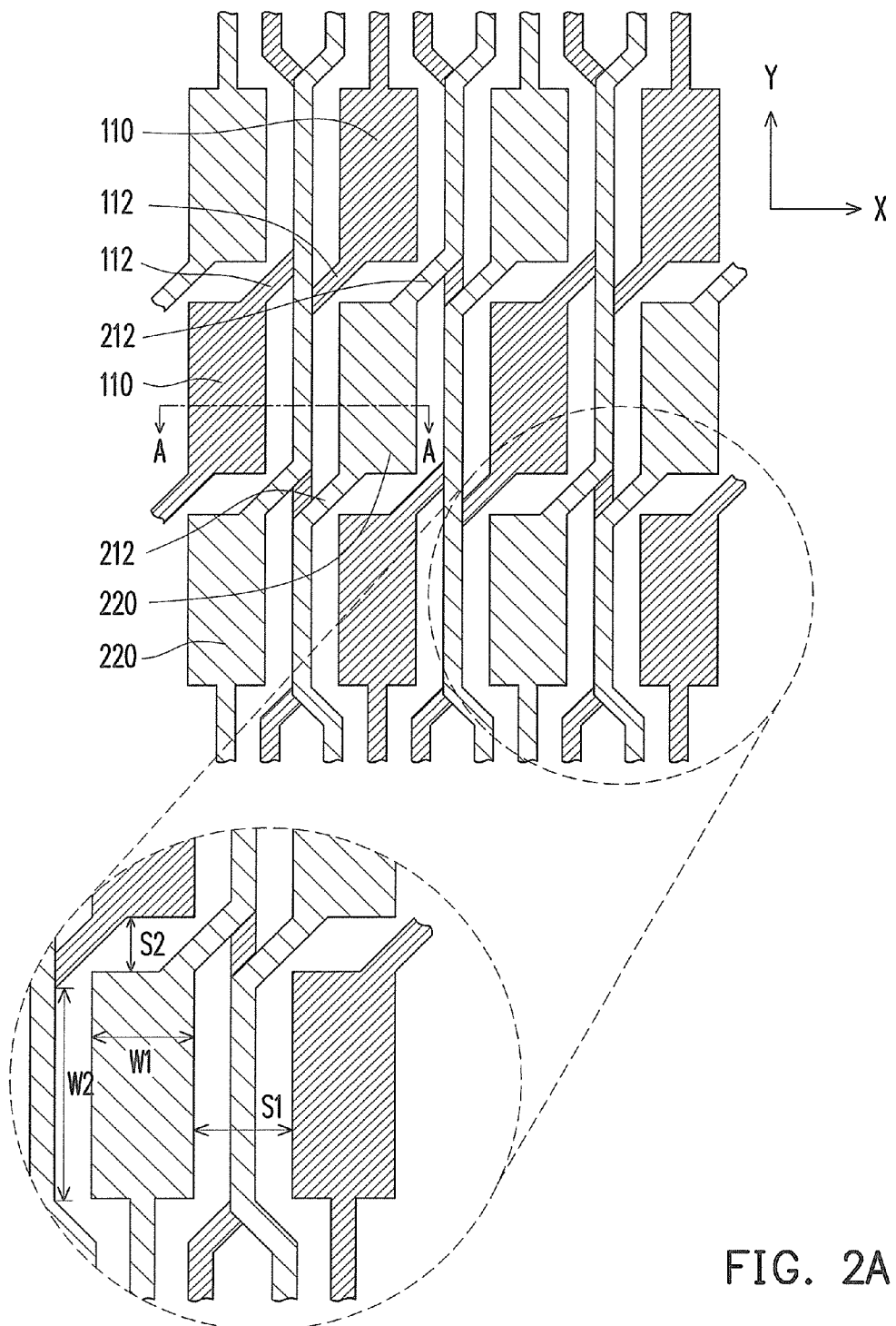
FIG. 2A is a schematic view illustrating lead lines and pads in a non-display region of a pixel array substrate according to an embodiment of the invention.
Figure 2B:
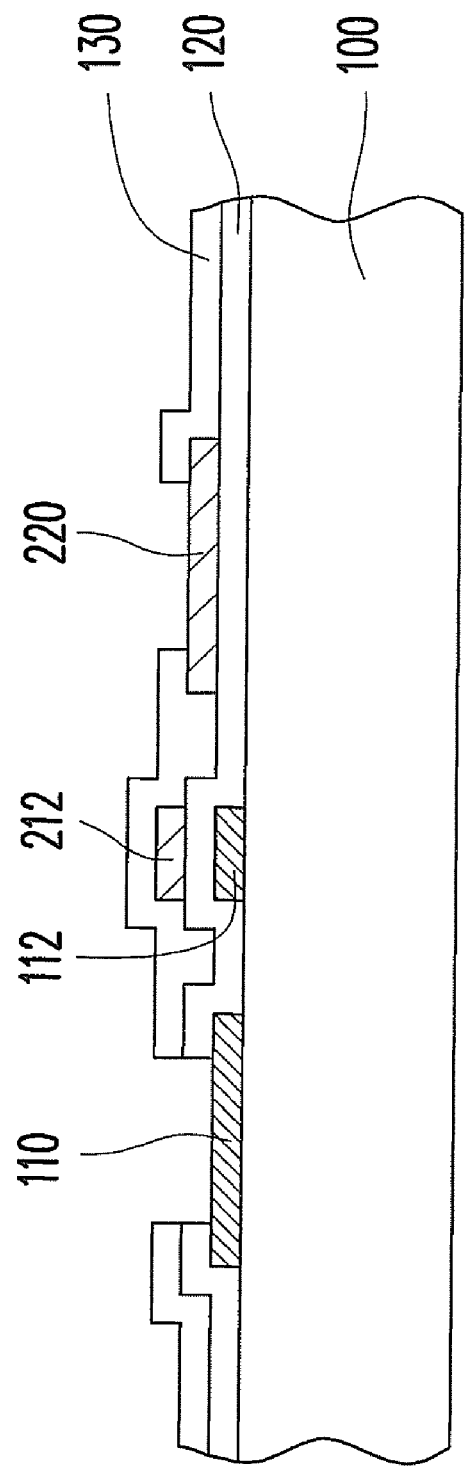
FIG. 2B is a schematic cross-sectional view taken along a sectional line A-A' depicted in FIG. 2A.

FIG. 1 is a schematic top view illustrating a pixel array substrate according to an embodiment of the invention. FIG. 2A is a schematic view illustrating lead lines and pads in a non-display region of a pixel array substrate according to an embodiment of the invention. FIG. 2B is a schematic cross-sectional view taken along a sectional line A-A' depicted in FIG. 2A. With reference to FIG. 1, FIG. 2A, and FIG. 2B, the pixel array substrate of this embodiment includes a substrate 100 that has a display region 102 and a non-display region 104. According to this embodiment, the substrate 100 can be made of glass, quartz, an organic polymer, a non-light-transmissive/reflective material, or any other appropriate material. The non-display region 104 is located at the periphery of the display region 102.

A pixel array is disposed in the display region 102 of the substrate 100, and the pixel array includes scan lines SL, data lines DL, and pixel structures P. The scan lines SL and the data lines DL are interlaced. In other words, an extending direction of the data lines DL is not parallel to an extending direction of the scan lines SL. Preferably, the extending direction of the data lines DL is perpendicular to the extending direction of the scan lines SL. Besides, the scan lines SL and the data lines DL can be in different layers or in the same layer. In consideration of electrical conductivity, the scan lines SL and the data lines DL are normally made of metallic materials. However, the invention is not limited thereto. According to other embodiments of the invention, the scan lines SL and the data lines DL can also be made of other conductive materials. The metallic material is, for example, an alloy, metal nitride, metal oxide, metal oxynitride, any other appropriate material, or a layer in which the metallic material and any other conductive material are stacked to each other. Each of the pixel structures P is electrically connected to a corresponding one of the scan lines SL and a corresponding one of the data lines DL, and each of the pixel structures P has an active device T and a pixel electrode PE. The active device T is, for example, a bottom gate thin film transistor (TFT) or a top gate TFT, and the active device T includes a gate, a channel, a source, and a drain. The gate is electrically connected to the scan line SL. The source is electrically connected to the data line DL. The drain is electrically connected to the pixel electrode PE. The channel is located between the gate and the source/drain.

The scan lines SL and the data lines DL extending to an edge of the display region 102 are connected to lead lines L. Thus, the lead lines L extend from the display region 102 to the non-display region 104 and are electrically connected to the driving chip 150 in the non-display region 104. That is to say, the driving chip 150 is electrically connected to the scan lines SL and the data lines DL in the pixel array through the lead lines L, such that driving signals of the driving chip 150 pass through the lead lines L and are transmitted to the scan lines SL and the data lines DL. Thereby, each of the pixel structures P can be controlled and driven.

In this embodiment, one driving chip 150 is disposed on the substrate 100, for instance. However, the number of the driving chip 150 is not limited in this invention. According to other embodiments of the invention, at least one driving chip 150 is disposed in the non-display region 104 when the dimension of the display panel is relatively large. On the other hand, the driving chips 150 are not restricted to be disposed only at one side of the display region 102. In other embodiments of the invention, the driving chips 150 can be disposed at two respective sides or four sides of the display region 102.

It should be mentioned that the lead lines L extending to the chip 150 has a structure that is depicted in FIG. 2A. Namely, lead lines (i.e., the first lead lines 112 and the second lead lines 212) and pads (i.e., the first pads 110 and the second pads 220) are located on the substrate 100 below the driving chip 150. To be more specific, the lead lines L extend below the driving chip 150 and can then be divided into the first lead lines 112 and the second lead lines 212. The first lead lines 112 are electrically connected to the first pads 110, and the second lead lines 212 are electrically connected to the second pads 220. In this embodiment, the first lead lines 112, the first pads 110, and the scan lines SL are in the same layer (i.e., the first metal layer), and materials of the first lead lines 112 and the first pads 110 are the same as the material of the scan lines SL, for instance. The second lead lines 212, the second pads 210, and the data lines DL are in the same layer (i.e., the second metal layer), and materials of the second lead lines 212 and the second pads 210 are the same as the material of the data lines DL, for instance. In addition, the first and the second pads 110 and 220 in this embodiment are not overlapped with the first and the second lead lines 112 and 212. Namely, none of the first and the second pads 110 and 220 is overlapped with the first and the second lead lines 112 and 212. In other embodiments of the invention, the first lead lines 112, the first pads 110, the second lead lines 212, and the second pads 220 can either be in one metal layer or in multiple conductive layers, which is determined based on design requirements and is not limited in this invention.

With reference to FIG. 2A and FIG. 2B, the first pads 110 and the first lead lines 112 are located on the substrate 100, and each of the first pads 110 is connected to one of the first lead lines 112. Since the first lead lines 112 and the second lead lines 212 are partially overlapped along a Y direction, the distance between the first pads 110 and the second pads 220 can be shortened. Besides, a first insulating layer separates the first lead lines 112 from the second lead lines 212. Hence, in the invention, the first lead lines and the second lead lines can be overlapped, and no short circuit occurs between the first and the second lead lines. In this embodiment, the first lead lines 112 are connected to tops and bottoms of the first pads 110 and extend along a vertical direction (i.e., the Y direction). When one of the first lead lines 112 extends in an upward manner, the first lead line 112 is then connected to one of the scan lines SL or one of the data lines DL in the pixel array. By contrast, when one of the first lead lines 112 extends in a downward manner, the first lead line 112 is then electrically connected to a test circuit or other circuits. In other embodiments of the invention, the first lead line 112 and the first pad 110 can be connected to one of the scan lines SL or one of the data lines DL in the pixel array, which is determined based on design requirement and is not limited in this invention.

The first insulating layer 120 (as shown in FIG. 2B) is disposed on the first lead lines 112 and the first pads 110. Here, the first insulating layer 120 covers the first lead lines 112 and exposes the first pads 110. The second pads 220 and the second lead lines 212 are located on the first insulating layer 120, and each of the second pads 220 is connected to one of the second lead lines 212. Similarly, in this embodiment, the second lead lines 212 are connected to tops and bottoms of the second pads 220 and extend along a vertical direction (i.e., the Y direction). When one of the second lead lines 212 extends in an upward manner, the second lead line 212 is then connected to one of the scan lines SL or one of the data lines DL in the pixel array. By contrast, when one of the second lead lines 112 extends in a downward manner, the second lead line 212 is then electrically connected to a test circuit or other circuits. In other embodiments of the invention, the second lead line 212 and the second pad 220 can be connected to one of the scan lines SL or one of the data lines DL in the pixel array, which is determined based on design requirement and is not limited in this invention. Accordingly, the first lead lines 112 and the second lead lines 212 are substantially parallel.

In this embodiment, a second insulating layer 130 can be disposed on the first insulating layer 120. The second insulating layer 130 covers the second lead lines 212 and exposes the first pads 110 and the second pads 220. However, the invention is not limited thereto. In other embodiments of the invention, the second insulating layer 130 can be omitted.

It should be mentioned that the first pads 110 and the second pads 220 can be exposed by forming an insulating material layer (not shown) after forming the first pads 110 and the first lead lines 112 according to an embodiment of the invention. The insulating material layer is then etched to form the first insulating layer 120 that exposes the first pads 110. The second pads 220 and the second lead lines 212 are formed on the first insulating layer 120, and another insulating material layer (not shown) is formed on the second pads 220 and the second lead lines 212 and is etched to form the second insulating layer 130 that exposes the first pads 110 and the second pads 220. According to another embodiment of the invention, the first pads 110 and the second pads 220 can be exposed by forming an insulating material layer (not shown) after forming the first pads 110 and the first lead lines 112. The second pads 220 and the second lead lines 212 are formed on the insulating material layer, and another insulating material layer (not shown) is formed on the second pads 220 and the second lead lines 212. The two insulating material layers are etched to form the first insulating layer 120 that exposes the first pads 110 and the second insulating layer 130 that exposes the second pads 220.

Additionally, in this embodiment, the first pads 110 and the second pads 220 are vertically arranged in a straight line (i.e., in the Y direction), and the first pads 110 and the second pads 220 are horizontally arranged in a straight line (i.e., in the X direction). Namely, the first pads 110 and the second pads 220 are aligned instead of being interlaced.

Besides, the first pads 110 and the second pads 220 are alternately arranged. For instance, the first and the second pads 110 and 220 are alternately arranged in the Y direction in the following order: the first pad 110, the second pad 220, the first pad 110 . . . , etc. By contrast, the first and the second pads 110 and 220 are alternately arranged in the X direction in the following order: the first pad 110, the second pad 220, the first pad 110, the second pad 220 . . . , etc.

In particular, the first lead lines 112 and the second lead lines 212 in this embodiment are at least partially overlapped. That is to say, in the embodiment depicted in FIG. 2A and FIG. 2B, the first lead lines 112 are almost completely covered/concealed by the second lead lines 212. Particularly, in the first lead lines 112 and the second lead lines 212, the line segments extending along the Y direction are completely overlapped, while the line segments to be connected to the first pads 110 or the second pads 220 are not overlapped.

The first lead lines 112 and the second lead lines 212 are overlapped, and therefore the distance between the first pads 110 and the second pads 220 can be shortened in this embodiment. In other words, a distance S1 between each of the first pads 110 and the adjacent second pad 220 along the horizontal direction (i.e., the X direction) is about 10 um~about 20 um. Preferably, the distance S1 between each of the first pads 110 and the adjacent second pad 220 along the horizontal direction (i.e., the X direction) is about 10 um~about 15 um.

According to this embodiment, the dimension of the first pads 110 and that of the second pads 220 are almost identical. The first pads 110 and the second pads 220 have a length W2 and a width W1, respectively. The length W2 ranges from about 40 um to about 120 um, and the width W1 ranges from about 12 um to about 26 um. Preferably, the length W2 ranges from about 40 um to about 90 um, and the width W1 ranges from about 14 um to about 26 um. On the other hand, a distance S2 between each of the first pads 110 and the adjacent second pad 220 along the vertical direction (i.e., the Y direction) is about 15 um~about 25 um.

Figure 5:
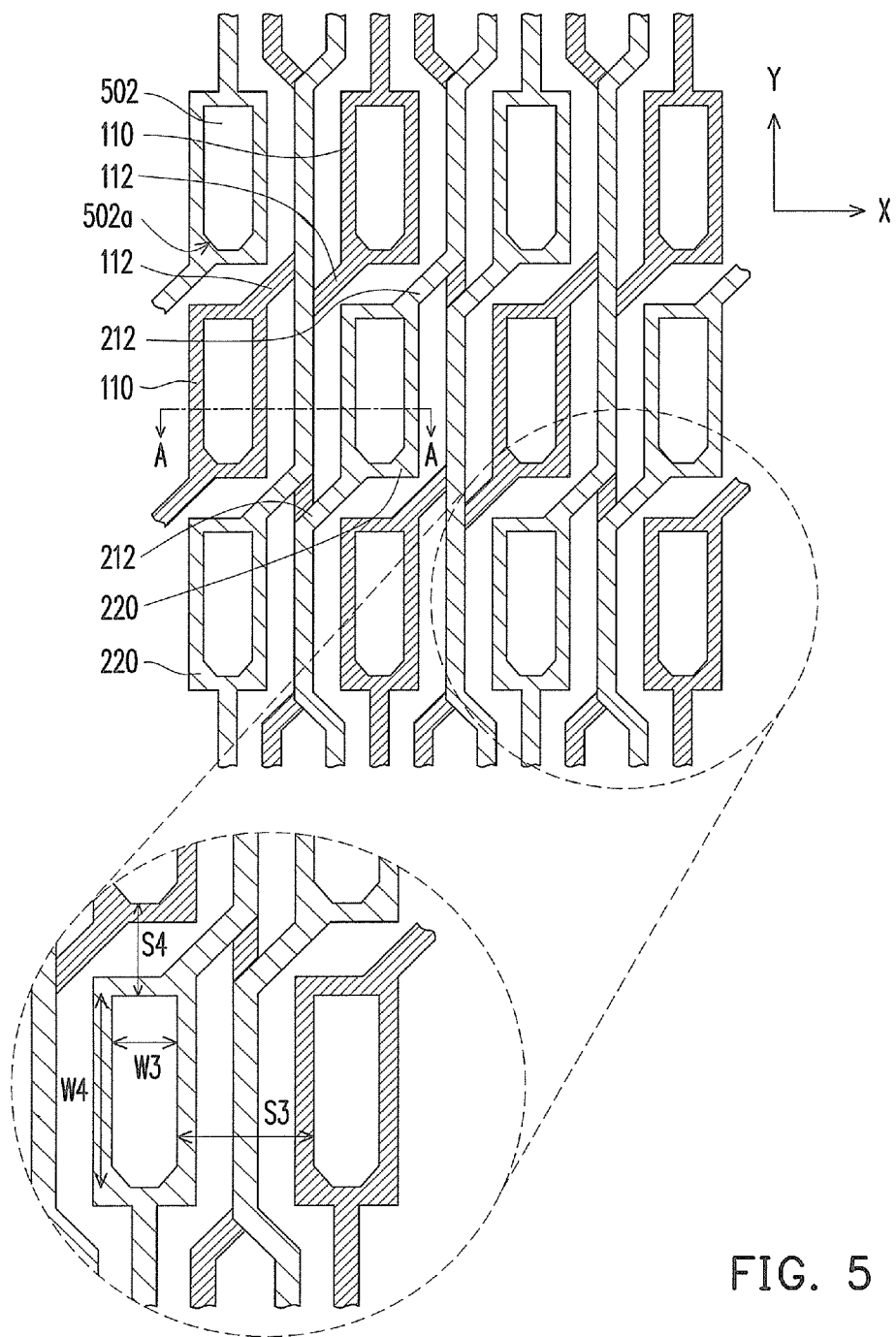
FIG. 5 is a schematic top view illustrating a driving chip bonded onto pads in a non-display region of a pixel array substrate according to an embodiment of the invention.
Figure 6:
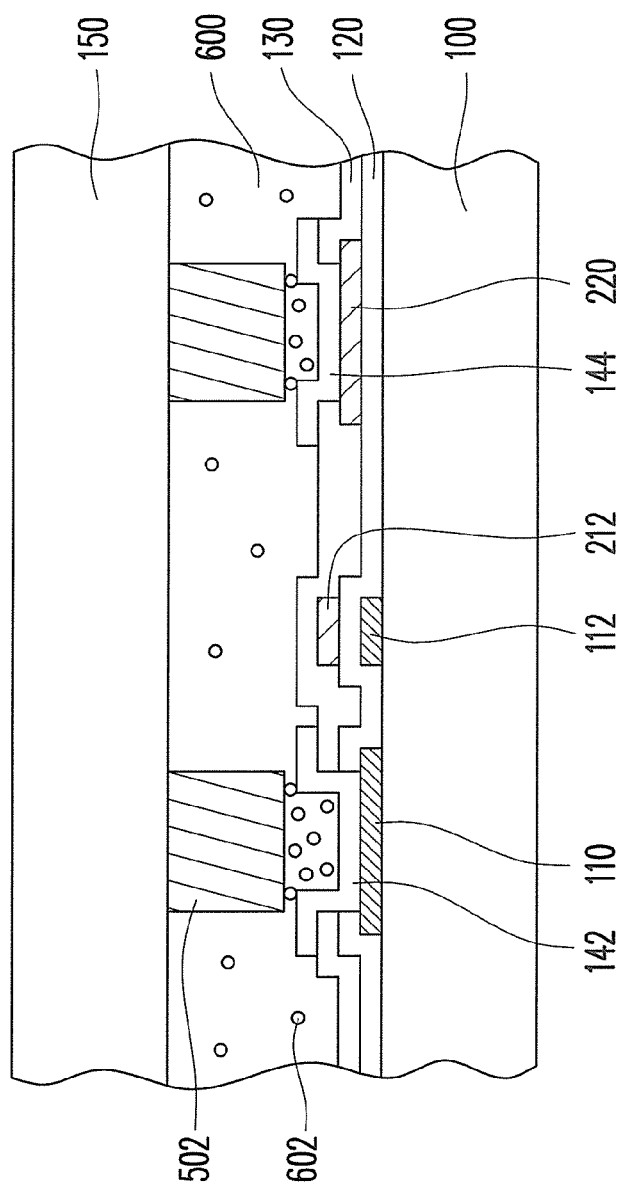
FIG. 6 is a schematic cross-sectional view taken along a sectional line A-A' depicted in FIG. 5.

In FIG. 2A and FIG. 2B, the conductive structure (i.e., the lead lines and the pads) below the driving chip 150 are depicted. However, these figures do not show the driving chip 150 covers the conductive structure. When the driving chip 150 is bonded onto the pads that are shown in FIG. 2A and FIG. 2B, the bonded structure is indicated in FIG. 5 and FIG. 6. FIG. 5 illustrates the structure of FIG. 2A after the driving chip is bonded. Note that FIG. 5 is a schematic view illustrating the conductive bumps on the driving chip are bonded to the pads on the substrate 100, while the bonded structure is shown in FIG. 6.

With reference to FIG. 5 and FIG. 6, a plurality of conductive bumps 502 are disposed on the driving chip 150, and the conductive bumps 502 are electrically connected to the first pads 120 and the second pads 220. In this embodiment, an anisotropic conductive adhesive 600 is further disposed between the conductive bumps 502 of the driving chip 150 and the first and the second pads 110 and 220. The driving chip 150 is adhered to the substrate 100 through the anisotropic conductive adhesive 600, and the first pads 110/the second pads 220 are electrically connected to the conductive bumps 502 through conductive particles 602 in the anisotropic conductive adhesive 600. Generally, in order to enhance electrical contact between the first pads 110/the second pads 220 and the conductive bumps 502, contact layers 142 and 144 are further formed on the first pads 110/the second pads 220. To be more specific, the contact layers 142 and 144 are formed on the first and the second insulating layers 120 and 130 and electrically contacted with the first pads 110 and the second pads 220 through openings in the first and the second insulating layers 120 and 130.

Note that each of the conductive bumps 502 of the driving chip 150 has at least one oblique structure 502a, as indicated in FIG. 5. Besides, each of the conductive bumps 502 of this embodiment has a length W4 and a width W3. The length W4 ranges from about 40 um to about 110 um, and the width W3 ranges from about 10 um to about 24 um. Preferably, the length W4 ranges from about 40 um to about 80 um, and the width W3 ranges from about 14 um to about 24 um On the other hand, a distance S3 between the conductive bumps 502 along the horizontal direction (i.e., the X direction) is about 12 um~about 20 um. Preferably, the distance S3 between the conductive bumps 502 is about 12 um~about 16 um. A distance S4 between the conductive bumps 502 along the vertical direction (i.e., the Y direction) is about 15 um~about 35 um.

The oblique structure 502a is conducive to the flow of the anisotropic conductive adhesive 600 (movement of the adhesive) during the bonding process, and the conductive particles 602 are less likely to gather around the corners of the conductive bumps 502. Besides, the first pads 110 and the second pads 220 are aligned, and therefore the conductive bumps 502 bonded onto the first pads 110 and the second pads 220 are neatly arranged along the X direction and the Y direction. Since the conductive bumps 502 are not interlaced, unobstructed adhesive-removing channels (i.e., where the lead lines 112 and 212 are located) are formed between two adjacent rows of conductive bumps 502. The arrangement of the conductive bumps 502 is conducive to the flow of the anisotropic conductive adhesive 600 (movement of the adhesive) during the bonding process. In another embodiment of the invention, each corner of the conductive bumps can have said oblique design, which is not limited in this invention.

In view of the above, the design of the pads and the lead lines in this embodiment leads to reduction of distance between the pads in an effective manner. As such, the pitch among the conductive bumps (i.e., the channels) of the chip can be reduced by 37% or more. In addition, the required amount of the anisotropic conductive adhesive can be reduced by 37% or more as well.

In the embodiment depicted in FIG. 2A and FIG. 2B, the first lead lines 112 and the second lead lines 212 are overlapped, which is not limited in this invention. The first lead lines 112 and the second lead lines 212 in other embodiments of the invention can be partially overlapped or are not overlapped, as described below.

Figure 3A:
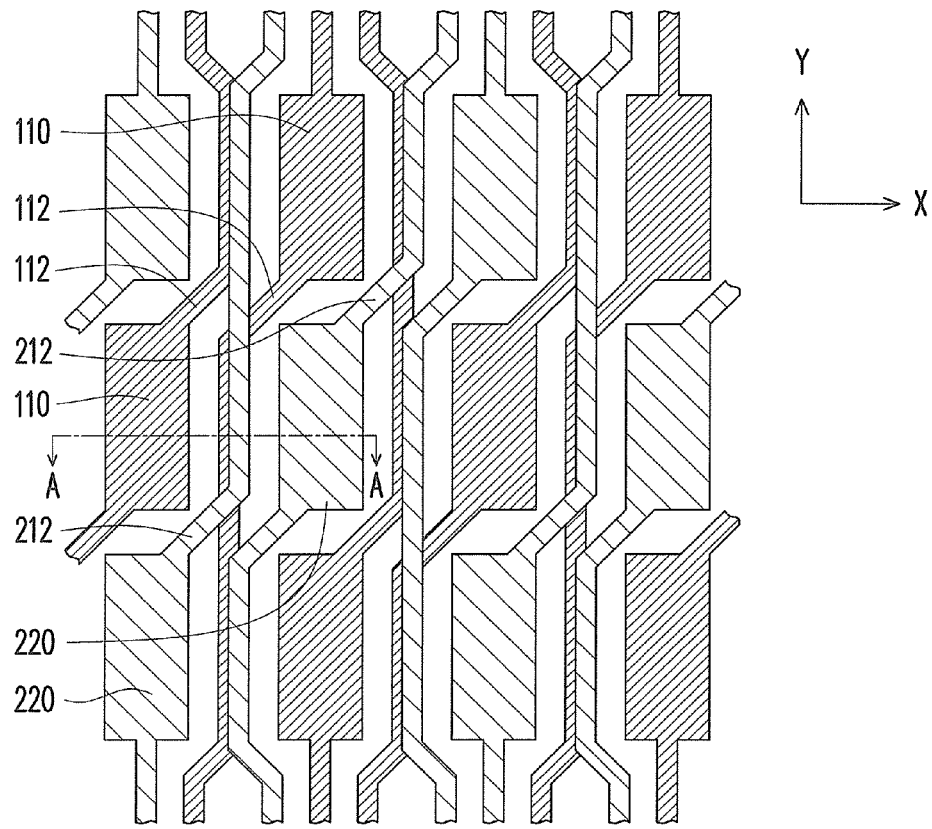
FIG. 3A is a schematic view illustrating lead lines and pads in a non-display region of a pixel array substrate according to an embodiment of the invention.
Figure 3B:
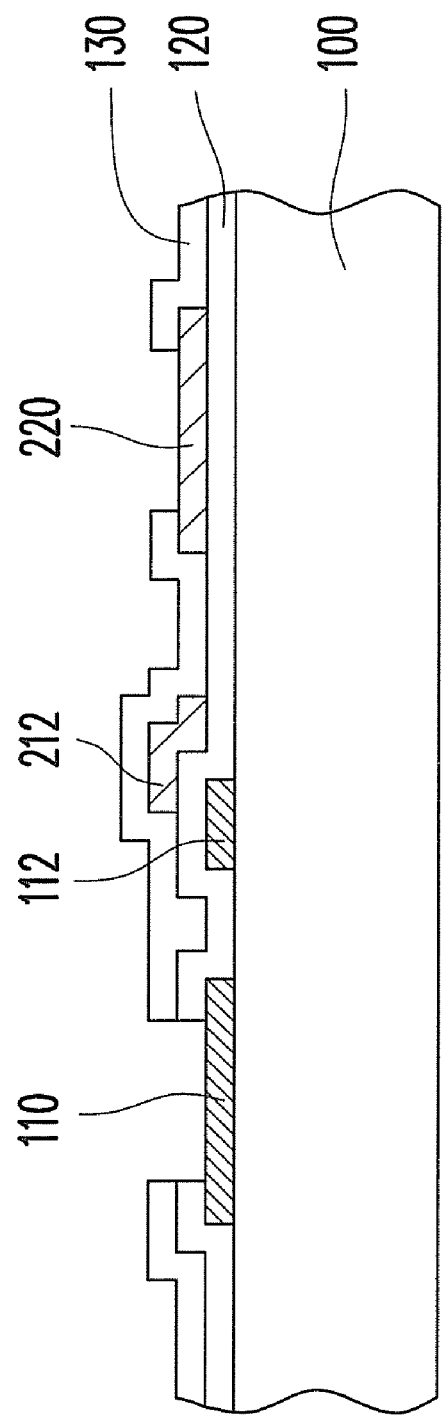
FIG. 3B is a schematic cross-sectional view taken along a sectional line A-A' depicted in FIG. 3A.

The embodiment depicted in FIG. 3A and FIG. 3B are similar to the embodiment depicted in FIG. 2A and FIG. 2B, and therefore the same elements in the embodiment depicted in FIG. 2A and FIG. 2B are represented by the same reference numbers in this embodiment depicted in FIG. 3A and FIG. 3B and will not be described hereinafter. The difference between the two embodiments lies in that the first lead lines 112 and the second lead lines 212 in this embodiment depicted in FIG. 3A and FIG. 3B are partially overlapped. That is to say, the first lead lines 112 are not completely covered/concealed by the second lead lines 212. In the first lead lines 112 and the second lead lines 212, the line segments extending along the Y direction are partially overlapped, while the line segments to be connected to the first pads 110 or the second pads 220 are not overlapped.

Similarly, the first lead lines 112 and the second lead lines 212 are partially overlapped, and therefore the distance between the first pads 110 and the second pads 220 can be shortened in this embodiment. In other words, the distance S1 between each of the first pads 110 and the adjacent second pad 220 along the horizontal direction (i.e., the X direction) is about 10 um~about 20 um. Preferably, the distance S1 between each of the first pads 110 and the adjacent second pad 220 along the horizontal direction (i.e., the X direction) is about 10 um~about 15 um.

Figure 4A:
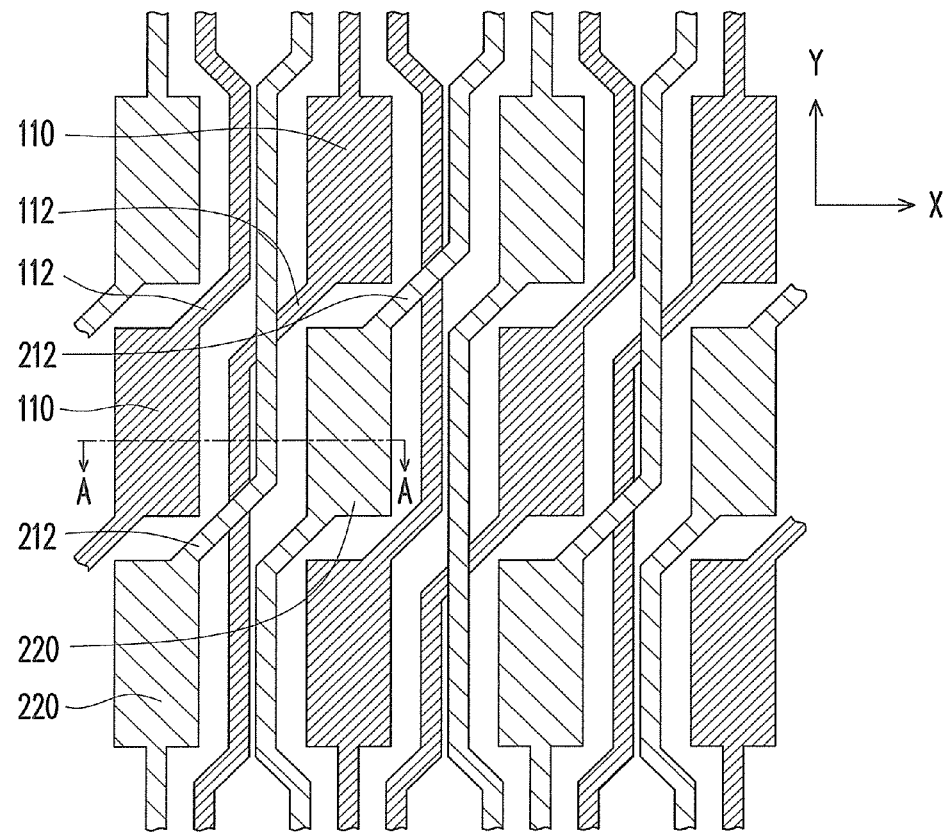
FIG. 4A is a schematic view illustrating lead lines and pads in a non-display region of a pixel array substrate according to an embodiment of the invention.
Figure 4B:
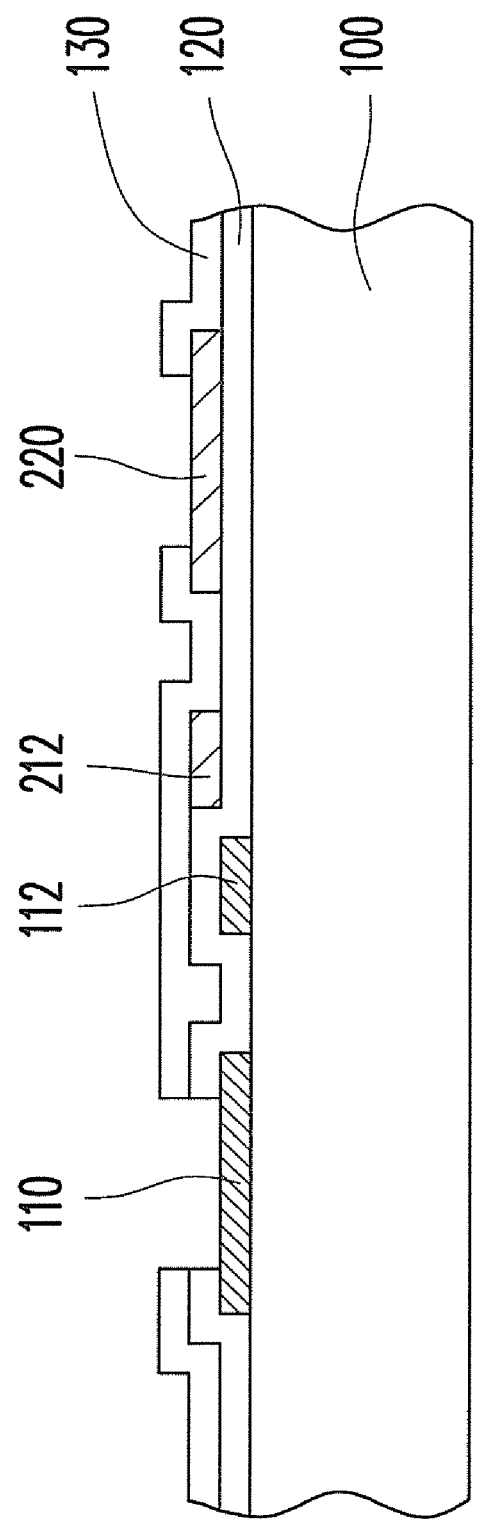
FIG. 4B is a schematic cross-sectional view taken along a sectional line A-A' depicted in FIG. 4A.

The embodiment depicted in FIG. 4A and FIG. 4B are similar to the embodiment depicted in FIG. 2A and FIG. 2B, and therefore the same elements in the embodiment depicted in FIG. 2A and FIG. 2B are represented by the same reference numbers in this embodiment depicted in FIG. 4A and FIG. 4B and will not be described hereinafter. The difference between the two embodiments lies in that the first lead lines 112 and the second lead lines 212 in this embodiment depicted in FIG. 4A and FIG. 4B are almost not overlapped. That is to say, the first lead lines 112 are almost not covered/concealed by the second lead lines 212. According to this embodiment, in the first lead lines 112 and the second lead lines 212, the line segments extending along the Y direction are not overlapped. However, the distance between the first lead lines 112 and the second lead lines 212 along the horizontal direction can be rather short. Moreover, the edge of the first lead lines 112 and the edge of the second lead lines 212 can even be aligned completely.

Although the first lead lines 112 and the second lead lines 212 are not overlapped, the distance between the first lead lines 112 and the second lead lines 212 along the horizontal direction can be rather short. Accordingly, the distance between the first pads 110 and the second pads 220 can be shortened in this embodiment. In other words, the distance S1 between each of the first pads 110 and the adjacent second pad 220 along the horizontal direction (i.e., the X direction) is about 10 um~about 20 um. Preferably, the distance S1 between each of the first pads 110 and the adjacent second pad 220 along the horizontal direction (i.e., the X direction) is about 10 um~about 15 um.

In the embodiment depicted in FIG. 3A and FIG. 3B and in the embodiment depicted in FIG. 4A and FIG. 4B, note that the first pads 110 and the second pads 220 are vertically arranged in a straight line (i.e., in the Y direction), and the first pads 110 and the second pads 220 are horizontally arranged in a straight line (i.e., in the X direction). Namely, the first pads 110 and the second pads 220 are aligned instead of being interlaced. Therefore, when the pads depicted in FIG. 3A and FIG. 3B or the pads depicted in FIG. 4A and FIG. 4B are bonded to the conductive bumps of the driving chip, the conductive bumps are neatly arranged along the X direction and the Y direction. Since the conductive bumps are not interlaced, unobstructed adhesive-removing channels (i.e., where the lead lines 112 and 212 are located) are formed between two adjacent rows of conductive bumps. The arrangement of the conductive bumps is conducive to the flow of the anisotropic conductive adhesive (movement of the adhesive) during the bonding process. Similarly, in the embodiment depicted in FIG. 3A and FIG. 3B or in the embodiment depicted in FIG. 4A and FIG. 4B, each of the conductive bumps of the driving chip can have the oblique design. This is conducive to the flow of the anisotropic conductive adhesive (movement of the adhesive), and the conductive particles are less likely to gather around the corners of the conductive bumps. In another embodiment of the invention, each corner of the conductive bumps can have said oblique design, which is not limited in this invention.

Figure 7:
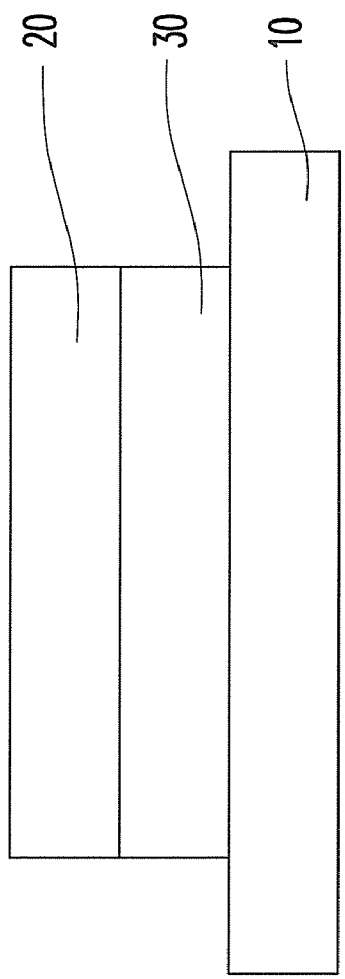
FIG. 7 is a schematic cross-sectional view illustrating a display panel according to an embodiment of the invention.

FIG. 7 is a schematic cross-sectional view illustrating a display panel according to an embodiment of the invention. With reference to FIG. 7, the display panel of this embodiment includes a pixel array substrate 10, an opposite substrate 20 located opposite to the pixel array substrate 10, and a display medium 30 located between the pixel array substrate 10 and the opposite substrate 20.

The pixel array substrate 10 can refer to the pixel array substrate 10 depicted in FIG. 1, and the lead lines and the pads in the non-display region 104 of the pixel array substrate 10 can be those shown in FIG. 2A and FIG. 2B, FIG. 3A and FIG. 3B, or FIG. 4A and FIG. 4B.

The opposite substrate 20 can be a blank substrate. Alternatively, the opposite substrate 20 can have opposite electrodes (not shown) disposed thereon. The opposite electrodes refer to a transparent conductive layer made of metal oxide, such as indium tin oxide (ITO) or indium zinc oxide (IZO). A color filter array (not shown) including red, green, and blue color filter patterns can be further disposed on the opposite substrate 20. Moreover, a light shielding pattern layer (not shown), which is also referred to as a black matrix, can be further disposed on the opposite substrate 20 and arranged between the patterns of the color filter array.

The display medium 30 includes liquid crystal molecules, an electrophoretic display medium, an organic light emitting display medium, or any other appropriate medium.

In light of the foregoing, the distance between each of the first pads and the adjacent second pad along the horizontal direction is about 10 um~about 20 um, and the first pads are separated from the second pads by the first insulating layer. Therefore, the pitch between the first and the second pads can be effectively shortened, and no short circuit occurs between the first and the second pads.

Moreover, the first pads and the second pads are arranged in a straight line along both the vertical direction and the horizontal direction instead of being interlaced, and so are the conductive bumps disposed on the first pads and the second pads. The arrangement of the conductive bumps is conducive to the flow of the anisotropic conductive adhesive (movement of the adhesive) during the bonding process.

Moreover, the conductive bumps of the invention can have the oblique structure, which is conducive to the flow of the anisotropic conductive adhesive (movement of the adhesive), and the conductive particles of the anisotropic conductive adhesive are less likely to gather around the corners of the conductive bumps.

It will be apparent to those skilled in the art that various modifications and variations can be made to the invention without departing from the scope or spirit of the invention. In view of the foregoing, it is intended that the invention cover modifications and variations of this invention provided they fall within the scope of the following claims and their equivalents.

What is claimed is:

1. A pixel array substrate comprising:
   a substrate having a display region and a non-display region;
   a pixel array located in the display region;
   a plurality of first lead lines electrically connected to the pixel array and extending from the display region to the non-display region;
   a plurality of first pads located in the non-display region, each of the first pads being electrically connected to a corresponding one of the first lead lines;
   a first insulating layer covering the first lead lines and exposing the first pads;
   a plurality of second lead lines located on the first insulating layer and electrically connected to the pixel array, the second lead lines extending from the display region to the non-display region; and
   a plurality of second pads located in the non-display region and disposed on the first insulating layer, each of the second pads being electrically connected to a corresponding one of the second lead lines,
   wherein a distance between each of the first pads and one of the second pads adjacent thereto along a horizontal direction is about 10 um~about 20 um.

2. The pixel array substrate as claimed in claim 1, wherein the distance between each of the first pads and one of the second pads adjacent thereto is about 10 um~about 15 um.

3. The pixel array substrate as claimed in claim 1, wherein the first lead lines and the second lead lines are substantially parallel.

4. The pixel array substrate as claimed in claim 1, wherein the first lead lines and the second lead lines are at least partially overlapped.

5. The pixel array substrate as claimed in claim 1, wherein the first pads and the second pads are vertically arranged in a straight line, and the first pads and the second pads are horizontally arranged in a straight line.

6. The pixel array substrate as claimed in claim 5, further comprising:
   at least one driving chip located in the non-display region of the substrate, wherein the at least one driving chip has a plurality of conductive bumps thereon, and the conductive bumps are electrically connected to the first pads and the second pads.

7. The pixel array substrate as claimed in claim 6, wherein each of the conductive bumps has at least one oblique structure.

8. The pixel array substrate as claimed in claim 6, further comprising an anisotropic conductive adhesive located between the conductive bumps of the at least one driving chip and the first and the second pads.

9. The pixel array substrate as claimed in claim 1, wherein the first pads and the second pads have a length ranging from about 40 um~about 120 um and a width ranging from about 12 um~about 26 um, respectively.

10. The pixel array substrate as claimed in claim 1, wherein the first and the second pads are not overlapped with the first and the second lead lines.

11. The pixel array substrate as claimed in claim 1, wherein the first and the second pads are alternately arranged.

12. The pixel array substrate as claimed in claim 1, further comprising a second insulating layer located on the first insulating layer, the second insulating layer covering the second lead lines and exposing the first pads and the second pads.

13. A conductive structure comprising:
   a first pad;
   a first lead line electrically connected to the first pad;
   a first insulating layer covering the first lead line and exposing the first pad;
   a second pad located on the first insulating layer; and
   a second lead line located on the first insulating layer and electrically connected to the second pad, wherein the first lead line and the second lead line are located between the first pad and the second pad, and a distance between the first pad and the second pad is about 10 um~about 20 um.

14. The conductive structure as claimed in claim 13, wherein the distance between the first pad and the second pad adjacent thereto is about 10 um~about 15 um.

15. The conductive structure as claimed in claim 13, wherein the first lead line and the second lead line are substantially parallel.

16. The conductive structure as claimed in claim 13, wherein the first lead line and the second lead line are at least partially overlapped.

17. The conductive structure as claimed in claim 13, wherein the first pad and the second pad have a length ranging from about 40 um~about 120 um and a width ranging from about 12 um~about 26 um, respectively.

18. The conductive structure as claimed in claim 13, further comprising a second insulating layer located on the first insulating layer, the second insulating layer covering the second lead line and exposing the first pad and the second pad.

19. A display panel comprising:
   a pixel array substrate as claimed in claim 1;
   an opposite substrate located opposite to the pixel array substrate; and
   a display medium located between the pixel array substrate and the opposite substrate.

* * * * *